INVENTORS
FRANKLIN C. ALBRIGHT
WARREN D. CHAMBERS
BY- John A. Young
ATTORNEY

INVENTORS
FRANKLIN C. ALBRIGHT
WARREN D. CHAMBERS
BY- John A. Young
ATTORNEY

INVENTORS
FRANKLIN C. ALBRIGHT
WARREN D. CHAMBERS
BY- John A. Young
ATTORNEY

United States Patent Office 2,990,216
Patented June 27, 1961

2,990,216
FORGED AIRCRAFT WHEELS FOR LANDING GEAR ASSEMBLIES

Franklin C. Albright and Warren D. Chambers, South Bend, Ind., assignors to The Bendix Corporation, a corporation of Delaware
Filed Nov. 19, 1956, Ser. No. 623,129
4 Claims. (Cl. 301—6)

This invention relates to forged wheel constructions for aircraft landing gears, these wheels being also constructed to accommodate a brake in some instances.

It is generally accepted in the aircraft wheel and brake art that a forged wheel construction is superior to a casting since the forged construction possesses superior strength properties and weighs less than a comparable cast construction. The strength and performance characteristics generally of a given forged wheel construction is more nearly duplicated with successive identical constructions than is the case with a given casting construction. This consistent superiority is highly desirable in the aircraft art where the designer attempts to obtain the necessary performance with minimum wheel weight. Thus, with a forged wheel design, that has proven satisfactory under laboratory conditions, the predictability of similar performance with a production model wheel of the same construction is much more reliable than with a cast wheel construction.

Another advantage of the forged wheel construction is the simplicity of the structural components. Because the forging is characterized by the absence of complicating ribs and cores, it is much easier to analyze the static and dynamic forces which act on the wheel during use. Since the forged construction lends itself to precise analysis, it is possible to construct the wheel so that it will accomplish the necessary performance requirements without having to guess as to the location and size of structural members to thereby add unnecessary weight to the wheel.

Other advantages of the forged wheel construction over the cast type construction involve greater ease of inspection of the forged construction and greater impact and tensile strength properties obtained with the forged construction over the cast wheel constructions. It is well known that the wrought properties of a forging make it greatly superior to comparable cast constructions from a strength and fatigue standpoint and thus for the same weight wheel, the forging provides a much higher capacity wheel.

It is essential in a forged wheel construction to make allowances for correct grain flow; otherwise, in manufacturing the forging, it is possible to encounter "cross grain flow." If the construction of the wheel should contain critically stressed portions having cross grain flow, then the construction is defective; and the advantages previously mentioned are more than offset by the weakness resulting from a wheel structure having locations affected by cross grain flow. It is an object of this invention to avoid constructions which could develop cross grain flow in critically stressed areas.

Another object of the invention is to achieve a two piece wheel construction, said pieces being individually forged and then coupled together to form the completed wheel structure, said wheel having additional reinforcement in some instances to rigidify the wheel.

Another important feature of the invention is that forgings of different materials may be provided and then assembled, according to their heat resistivity so that the part of the wheel subjected to the greater amount of heat will consist of material more resistant to heat, and the balance of the wheel which is less heat resistant may be made of lighter material. The result is that the completed wheel structure is light but yet capable of withstanding braking heats.

An over-all object of the invention is to provide a more durable and lighter weight aircraft wheel which is economical to produce and relatively easy to service.

The forged construction is more economical to produce because there is less scrap, there is no requirement for X-ray testing of parts, and the construction inherently makes for better producibility.

Other objects and features of the invention will become apparent from a consideration of the following description which proceeds with reference to the accompanying drawings wherein a plurality of embodiments of the invention are illustrated by way of example.

Figure 1:
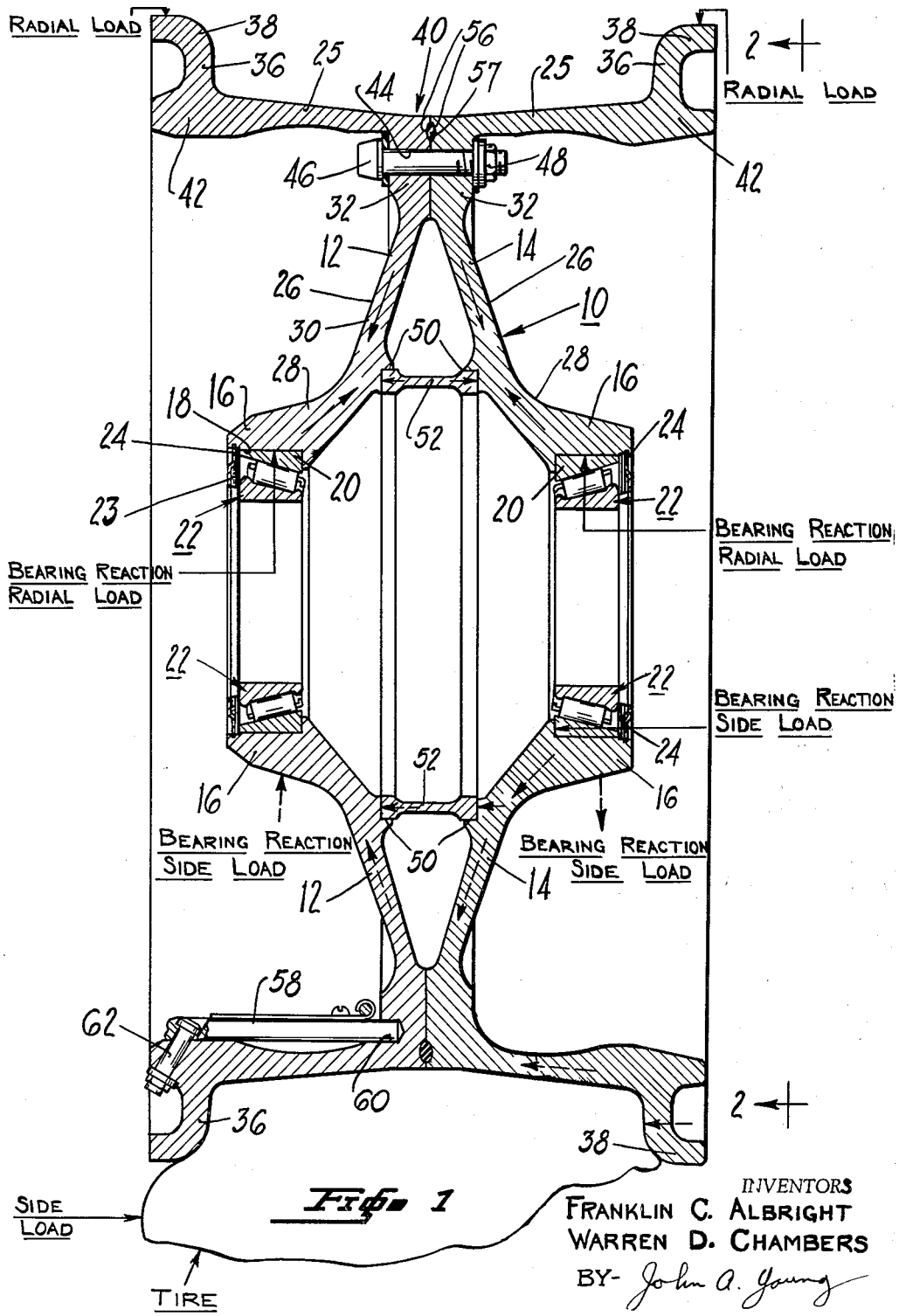
FIGURE 1 is an axial section view of an aircraft wheel with the wheel forces illustrated thereon so that the wheel forces can be analyzed.
Figure 2:
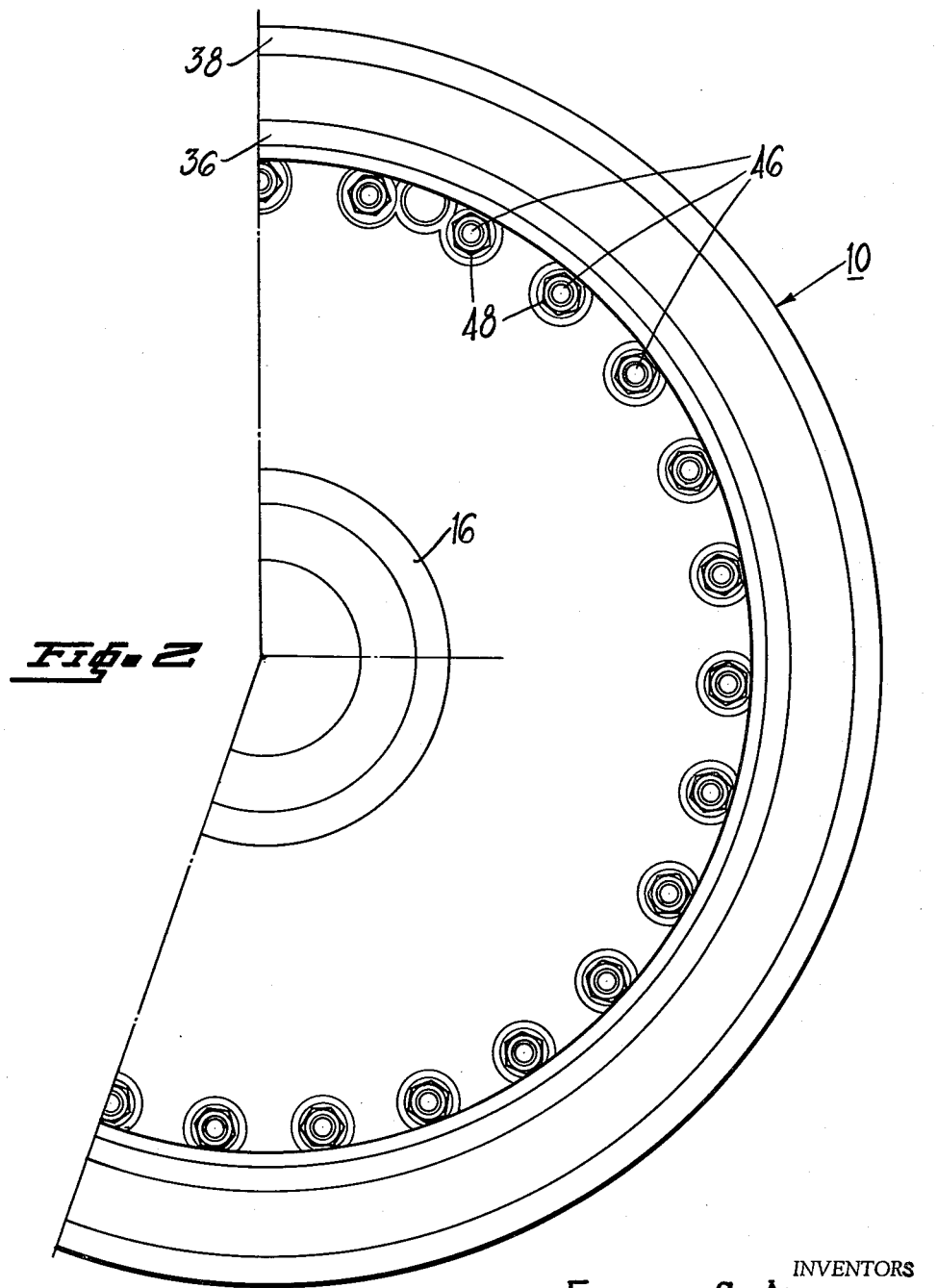
FIGURE 2 is a side view of the wheel shown in FIGURE 1, looking from the right hand side thereof.

Referring first to the embodiment shown in FIGURES 1 and 2, the aircraft wheel is designated generally by reference numeral 10. The wheel 10 comprises two substantially identical forgings 12 and 14 which are joined together to form the wheel. The wheel is axially symmetrical as indicated in FIGURE 1. Since the two forgings 12 and 14 are nearly identical, only one of them will be described in detail. The forging 12 which may be of magnesium or the like has a hub portion 16 with a bore 18 formed therethrough to receive the cup 20 of a tapered roller bearing assembly 22. A snap ring 24 retains the grease seal 23 against the roller bearing cup 20 which is shrunk fit in place.

The hub 16 is made thicker toward the center of the wheel; this increase in size of the hub corresponds to the taper of the cup 20, in order to permit a uniform stress distribution along the width of the roller bearing thereby preventing cocking of the cup 20. To support the rim 25 of the wheel on the hub 16 there is provided a cone 26 having three segments 28, 30, and 32 which taper gradually to a successively flatter shape thus forming radial ribs of tapered cross section so that the wheel disk has a gradually tapered profile as indicated in FIGURE 1.

Referring to FIGURE 1, it will be noted that the rim 25 is constructed transversely to segment 32 of the cone 26, segment 32 being sometimes referred to as a "fillet." Surrounding the outer edge of the rim 25 is a flange 36 having a quarter round shoulder 38 which provides lateral support for a tire (not shown) that is fitted into what is known as the tube well 40, the space between the flanges 36 at opposite sides of the rim. The flange 36 has an enlarged portion 42 to prevent fracture of the rim 25.

The segments 32 of the two forgings 12 and 14 lie flat against one another and have matched openings 44 formed therein to receive bolts 46. Bolts 46 are threaded to receive nuts 48 which are screwed down to clamp the two segments 32 together and thus couple the two forgings to make up the completed wheel.

Circular grooves 50 are formed at the confluence of segments 28 and 30 of the cones 26 and a circular reinforcement member 52 is positioned therebetween to rigidify the wheel structure.

The various forces which are imposed on the wheel will next be considered in order to analyze how the wheel structure withstands these forces. The radial loads indicated at the two sides of the wheel are exerted in a direction indicated by the arrows. These radial forces are opposed by bearing reaction forces which are exerted through the tapered roller bearings. The vertical component of the bearing reaction forces is equal in amount and opposite in direction to the radial loads imposed at the rim of the wheel. The bearing reaction forces are exerted through the tapered cup 20.

The radial loads tend to produce a bending of the conical portions of the wheel halves but this bending is resisted by circular member 52 which is compressed between the two cones 26. Compression of the circular member 52 prevents collapsing or bending of the conical portions of the wheel under radial loading. The circular reinforcing member 52 also distributes bearing reaction forces from one conical portion to the other. The bearing reaction forces, being exerted through a tapered surface, are resolved into vertical and horizontal components, the horizontal component being transmitted through the reinforcing ring 52 to the other wheel half. Because the bearing reaction forces are thus distributed between the two wheel halves there is provided complete utilization of all the wheel components for absorbing the impact of landing and resisting stresses imposed on the wheel during usage.

In usage, the aircraft wheel is at times subjected to side loading. One wheel half, for example, tends to move upwardly and the same force does not occur at the opposite wheel half. These forces which tend to twist the wheel halves are designated by those in the art as side loads. The wheel is stabilized against these side loads by the reinforcement member 52 which in conjunction with the wheel sides forms an A-shaped cross section (FIGURE 1). Assuming the force indicated by the solid arrow at the lower portion of FIGURE 1, the side load will tend to move the hub portion 16 of forging 12 downwardly (as indicated by the dotted arrow) and the hub portion of forging 14 upwardly. The side load on the wheel, indicated by the solid arrow in FIGURE 1, is resisted by a balancing force developed by the bearings 22 on the hub 16, to resist the moment developed by the side load against the tire. The resisting balancing force exerted by the bearings is indicated in the wheel structure by the dashed line arrows at the bottom portion of the wheel half in FIGURE 1. This imposes a shear force on circular member 52, which because of its large diameter and cylindrical shape, is capable of withstanding a high order of shear loads. The circular member 52 opposes side loading of the wheel, and acts through shoulders 50 to prevent relative movement of the two forgings 12 and 14 to thereby rigidify the wheel.

Two matched recesses 56 are formed in the forgings to receive an O-ring seal 57. The wheel may thus be used in combination with a tubeless type tire.

A number of rotor drive keys 58 are spaced around the circumference of the wheel in combination with forging 12. The one end of the key is received in an opening 60 of segment 32 and the other end of the key is bolted by means of bolts 62 to portion 42 of flange 36. The rotor drive keys 58 are thus held in place on the wheel and drive the rotatable parts of the brake.

It is apparent from a consideration of the over-all construction of the wheel it is very simple to machine and process generally.

It should also be noted that the construction provides a generally smooth contour for each section so that there are no stress concentrations which can give rise to failure of parts of the wheel. The smoothly contoured construction also permits the desirable grain flow during forging operation in order to prevent "cross grain" structure in any critical parts of the forging.

Figure 3:
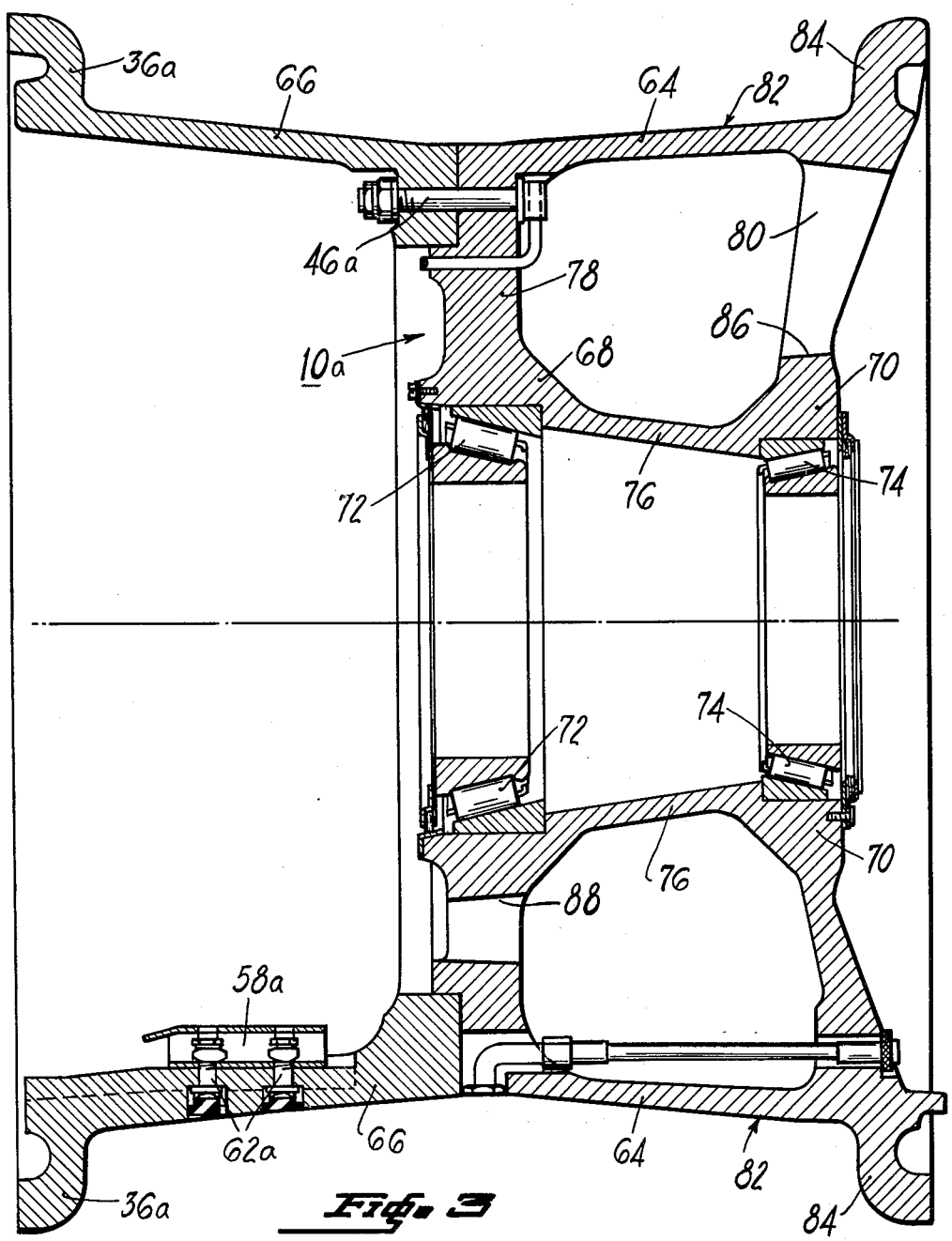
FIGURE 3 is a second embodiment of the invention, illustrating how the wheel may consist of both cast and forged parts, FIGURE 3 being an axial section view of the wheel.

Referring next to the embodiment shown in FIGURE 3, parts corresponding to those previously described will receive the same reference numeral and the subscript "a." The wheel 10a consists of a cast portion 64 and a forged portion 66.

The cast portion of the wheel has two axially spaced apart hub segments 68 and 70 which are supported on anti-friction bearings 72 and 74. A circular reinforcement ring 76 bridges the two hub portions 68 and 70. Wheel disks 78 and 80 extend radially from the hub portions 68 and 70 and a rim haft 82 is formed transversely to the wheel disks and is integral therewith. Flange 84 is located at one side of the rim 82 and provides support for the tire bead (not shown). Ventilating windows 86 are provided in wheel disk 80 and openings 88 are provided in wheel disk 78 so that air is circulated through the wheel to dissipate braking heat.

Forging 66 is coupled with wheel disk 78 by means of bolts 46a. The forging 66 forms the other rim half to complete the tire well. Flange 36a is formed around the periphery of the forging to support the tire bead in the same manner as flange 84 on the right hand side of the wheel. A plurality of rotor drive keys 58a are spaced around the circumference of the forging 66 and are secured thereto by means of bolts 62a. The construction shown in FIGURE 3 has the advantage of combining the casting and the forged construction in the same wheel, and in this way certain advantages of the lighter weight forging may result in an over-all weight saving of the wheel. The forging may be either an aluminum or magnesium forging.

Figure 4:
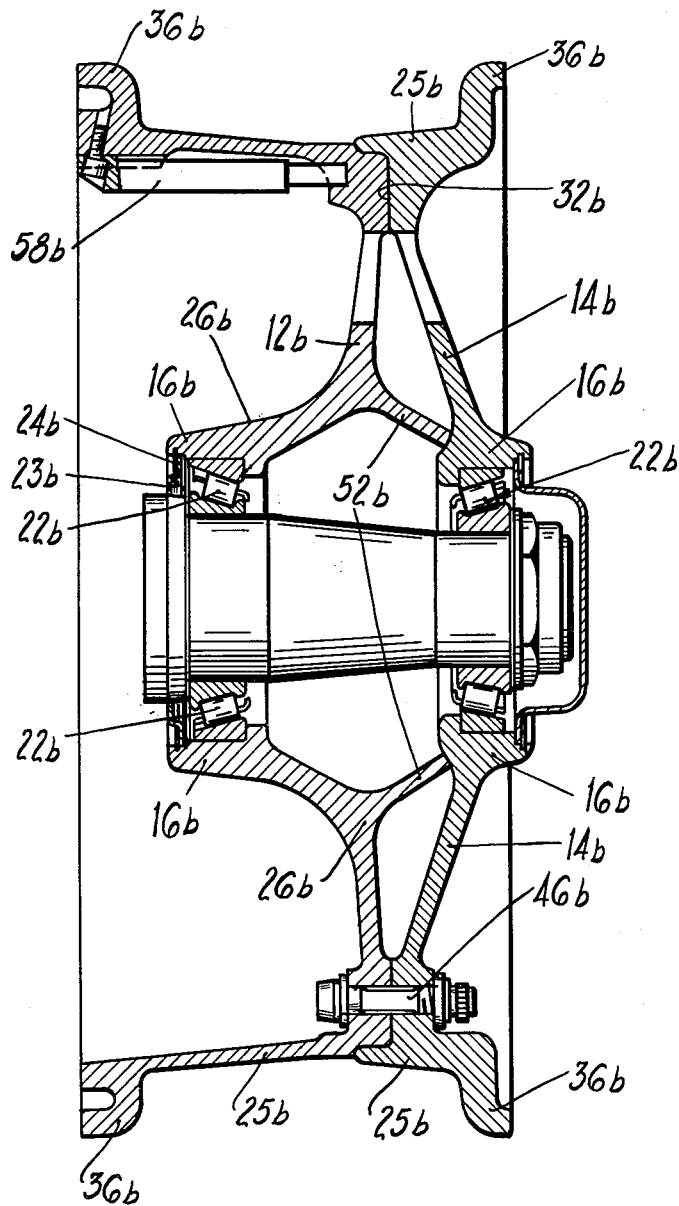
FIGURE 4 is an axial section view of a further embodiment of the invention.

Referring next to the embodiment shown in FIGURE 4, parts corresponding to the embodiment shown in FIGURES 1 and 2 will be designated by the same reference numeral but include the subscript "b." The two forgings 12b and 14b include hub segments 16b which are mounted on anti-friction bearings 22b. The wheel disk 26b of forging 12b is rounded with a gradual curvature until it becomes substantially vertical, radially outwardly from the axis of rotation of the wheel. A part of the wheel disk 26b is provided with a conical extension 52b which bears against the hub 16b of forging 14b. The conical portion of forging 14b inclines toward forging 12b and is formed with a flat surface 32b radially outwardly from the axis of rotation of the wheel to lie against the outwardly projected flat face 32b of wheel disk 26b. The two forgings are held together by means of bolts 46b which pass through abutting portions 32b of the wheel disks.

Transverse rim portions 25b are constructed perpendicularly to the wheel disks. At the opposite sides of the rims there are formed flanges 36b which support the tire bead (not shown). The vertical (or radial) load on the wheel can be considered as concentrated at the center line of the wheel. It will be noted that this load is somewhat offset from the wheel disks and this causes a tendency for the wheel disk 26b of forging 12b to collapse. The wheel disk is reinforced against this by means of the member 52b which is compressed. The resistance offered by member 52b prevents distortion of the wheel disk 26b. Because the member 52b bears against the forging 14b at the hub 16b thereof, only very slight twisting movement is exerted on the forging 14b and the compressive loads of 52b are transmitted to the axle without appreciative bending moments exerted on forging 14b. It is thereby possible to construct the wheel disk of forging 14b of very thin cross section and of shallow pitch.

Figure 5:
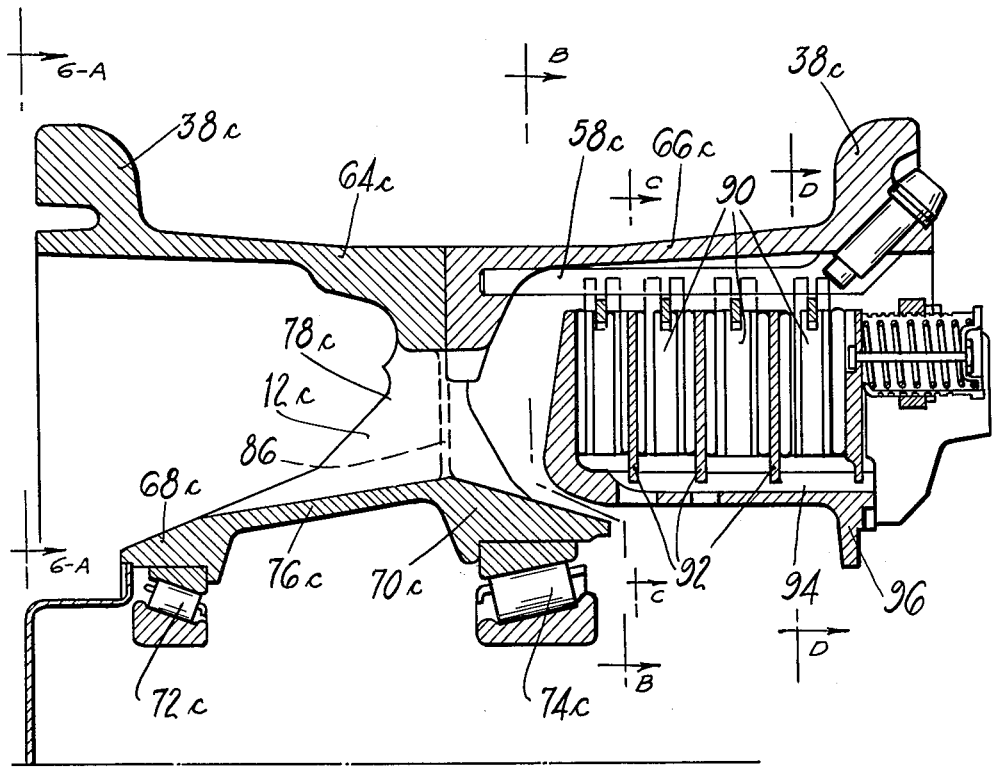
FIGURE 5 shows in axial section view, a further embodiment of an aircraft wheel shown equipped with a suitable brake.
Figure 6:
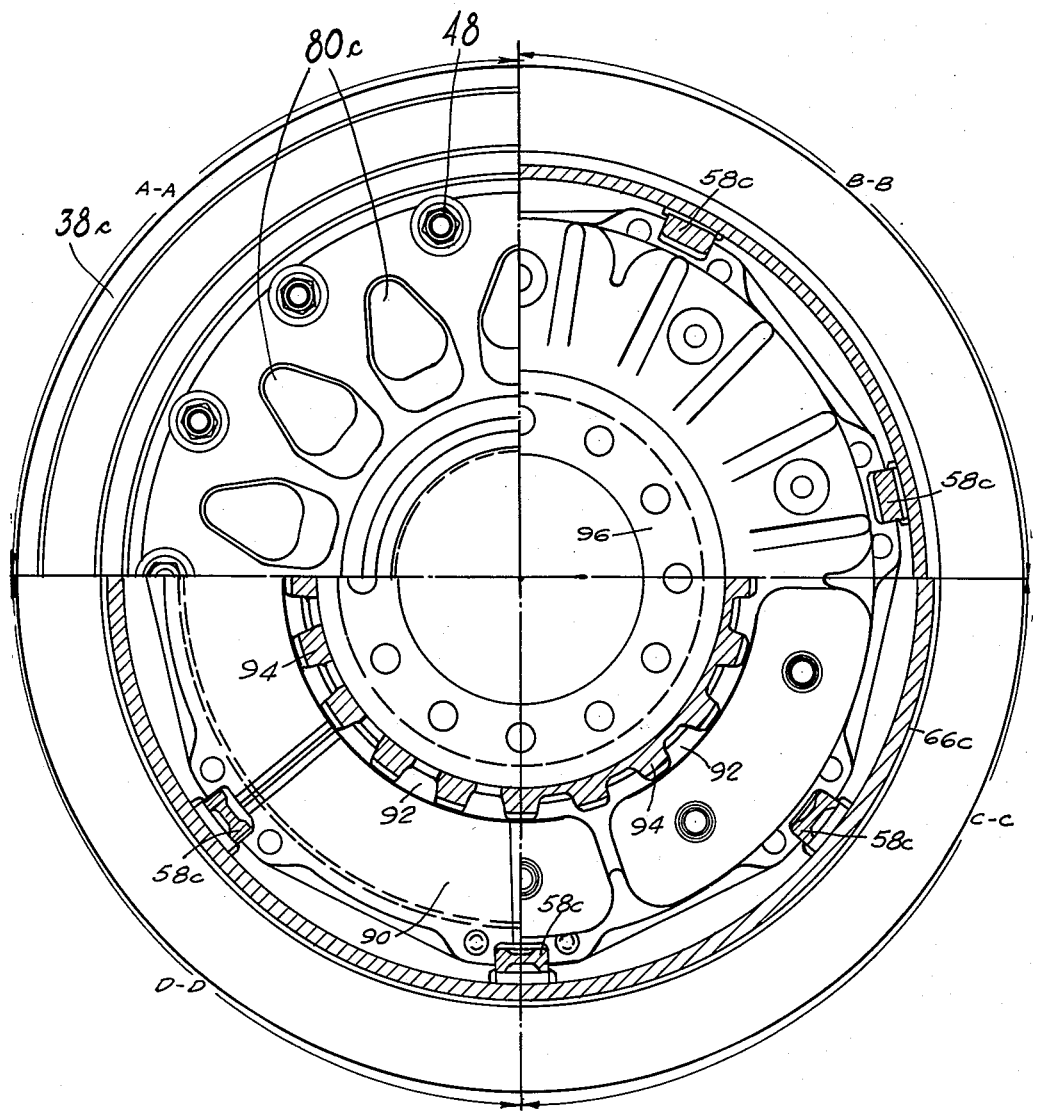
FIGURE 6 is a composite side view of the wheel and brake shown in FIGURE 5, looking from the right hand side thereof and with axial sections taken along the indicated lines in FIGURE 5.

Referring next to the embodiment shown in FIGURES 5 and 6, parts of the wheel structure corresponding to those previously described will receive the same reference numeral but include the subscript "c."

Forging 12c has two axially spaced apart hub portions 68c and 70c which are supported on anti-friction bearings 72c and 74c; the bearing 74c which is located closer to the center line of the brake being larger than the bearing 72c since it supports a greater portion of the vertical load. A circular reinforcement member 76c bridges the two hub portions 68c and 70c to provide reinforcement for the wheel and to enclose the cavity between the two bearings.

The wheel disk 78c extends radially from the two hub portions 68c and 70c and has a generally smooth contour which decreases in width radially outward from the hub of the wheel. A number of ventilating windows 80c (FIGURE 6) are forged in the wheel half 78c and the parting flash 86 (FIGURE 5) is punched out to open the window or complete the ventilating opening.

A rim half 64c is constructed transversely to wheel half 78c and flange 38c is formed at one side of the rim to provide support for the tire bead (not shown).

A second forging 66c is secured to wheel half 78c. The forging 66c is matched with forging 12c to complete the rim of the wheel. A flange 38c is formed on forging 66c to provide lateral support for the tire bead as does the flange on the opposite side of the wheel.

Forging 66c overlies the braking cavity and has a plurality of keys 58c secured thereto. The keys 58c engage and drive rotors 90. The rotors 90 are interleaved with stators 92 which are keyed to a fixed part of the brake 94. Brake carrier 96 provides support for the brake which extends axially into the cavity provided below the forging 66c.

Although the invention has been described in connection with but a relatively few selective embodiments, it will be apparent to those skilled in the art that the principles disclosed are general in nature and are not to be considered restricted to the example embodiments.

We claim:
1. A forged wheel construction for aircraft landing gear comprising two symmetrical wheel halves, each of said wheel halves including a hub portion with a circular slot formed therein to receive a bearing cup, a wheel cone formed in circular segments of successively flatter cross section, and a rim constructed transversely to the radially outermost circular segment, and having an annular flange on the periphery of said rim, said two symmetrical wheel halves being placed back to back to form a completed wheel structure, a plurality of fastening members received through the radially outermost circular segments to clamp the wheel halves together, a circular reinforcing member mounted between said wheel halves and clamped against recesses in the radially innermost segments of the wheel cones, said wheel cones and said rims of each of said wheel halves constructed with a smooth or ribless surface permitting stress distribution so that there are no points of stress concentrations, and a plurality of circumferentially spaced brake rotor drive keys secured to one of the wheel halves and supported thereby independently of the other wheel half, said rotor keys extending at one end into but not through the outermost wheel cone segment and at the other end fastened to said annular flange.

2. A forged wheel for aircraft landing gear comprising two wrought wheel halves having hub portions constructed and arranged to receive the cups of anti-friction bearings, two wheel cones extending radially from said hub portions to form a cavity therebetween, the radially innermost segments of said wheel cones being tapered toward each other, a circular reinforcing member which is fitted between said radially innermost segments to transmit loads therebetween and resist side loading of said wheel, two successive segments of said wheel cones which become progressively flatter radially outward from the wheel hub so that the radially outermost segments of said wheel cones are in mutually supporting engagement, fastening means securing said wheel halves together at the radially outermost segments of said wheel cones to retain said wheel halves in assembled relation, oppositely-extending rims transversely formed on the radially outermost segments of said wheel cones to provide a tire-supporting well, said two wheel cones and said oppositely extending rims constructed with a smooth or ribless surface permitting stress distribution so that there are no points of stress concentrations, and a flange constructed on the axially outermost edge of each of said rims to laterally retain the tire on said rim.

3. A forged wheel construction for aircraft landing gear comprising two wheel halves joined to form an axially symmetrical wheel, each of said wheel halves comprising a hub, a wheel cone formed with gradually sloping segments with the radially outermost segments of said wheel halves lying in flat abutting relation, a circular reinforcing member received in the wheel cavity between said wheel cones and clamped between the sloping segments of said wheel disks to transmit load between said wheel halves, said reinforcing member further serving to strengthen the wheel during side loading thereof by providing shear resistance to relative radial displacement of said wheel halves, a tire supporting rim half formed on each of said wheel halves, said rim halves being joined to form a complete tire well, said wheel cones and said rim halves constructed with a smooth or ribless surface permitting stress distribution so that there are no points of stress concentrations, and a flange on each of the axially outermost edges of said rim halves to laterally support the tire received in said tire well.

4. A forged aircraft wheel for use in a landing gear assembly, comprising two hub portions having circular grooves in the inner periphery thereof to receive the cups of tapered roller bearings, a wheel disk having rounded merging integration with said hub portions, the sides of said wheel disk being gradually sloped together as they extend radially outward, a circular reinforcement extending between said hub portions to rigidify the wheel structure, a two-part forged rim which is joined together at the approximate axial centerline of the wheel and supported by said wheel disk, said wheel disk and said two-part forged rim constructed with a smooth or ribless surface permitting stress distribution so that there are no points of stress concentrations, and a quarter round cross section flange formed on the axially outermost edge of opposite sides of the rim to laterally support a tire which is carried by said rim.

References Cited in the file of this patent

UNITED STATES PATENTS

| 1,378,301 | Williams | May 17, 1921 |
| 2,075,294 | Le Jeune | Mar. 30, 1937 |
| 2,367,825 | Shaw | Jan. 23, 1945 |
| 2,580,001 | Butler | Dec. 25, 1951 |

FOREIGN PATENTS

| 919,055 | France | Nov. 18, 1946 |
| 1,022,077 | France | Dec. 10, 1952 |